(12) United States Patent
Williamson et al.

(10) Patent No.: US 12,194,814 B2
(45) Date of Patent: Jan. 14, 2025

(54) AIR DISTRIBUTION APPARATUS

(71) Applicant: Dometic Sweden AB, Solna (SE)

(72) Inventors: Jarrod Williamson, Olinda (AU); Louis Liu, JinWan (CN); Jason Svarc, Kinglake West (AU)

(73) Assignee: Dometic Sweden AB, Solna (SE)

( * ) Notice: Subject to any disclaimer, the term of this patent is extended or adjusted under 35 U.S.C. 154(b) by 0 days.

(21) Appl. No.: 18/449,354

(22) Filed: Aug. 14, 2023

(65) Prior Publication Data

US 2023/0382192 A1 Nov. 30, 2023

Related U.S. Application Data

(63) Continuation of application No. 17/854,869, filed on Jun. 30, 2022, now Pat. No. 11,760,167, which is a continuation of application No. 16/384,376, filed on Apr. 15, 2019, now Pat. No. 11,376,925.

(30) Foreign Application Priority Data

Apr. 16, 2018 (AU) ................................ 2018901268

(51) Int. Cl.
*B60H 1/24* (2006.01)
*B60H 1/00* (2006.01)

(52) U.S. Cl.
CPC ......... *B60H 1/245* (2013.01); *B60H 1/00028* (2013.01); *B60H 1/247* (2013.01); *B60H 2001/00185* (2013.01)

(58) Field of Classification Search
CPC ................ B60H 1/245; B60H 1/00364; B60H 1/00357; B60H 1/262; B60H 1/00564; B60H 2001/00235
See application file for complete search history.

(56) References Cited

U.S. PATENT DOCUMENTS

| | | | |
|---|---|---|---|
| 2,504,472 A * | 4/1950 | Van Alsburg | F24F 13/062 454/302 |
| 2,701,998 A | 2/1955 | Wulle | |
| 3,343,473 A | 9/1967 | Gillick | |
| 3,648,591 A | 3/1972 | Winnett | |

(Continued)

FOREIGN PATENT DOCUMENTS

| | | |
|---|---|---|
| AU | 2005206673 B2 | 8/2007 |
| AU | 319629 S | 5/2008 |

(Continued)

OTHER PUBLICATIONS

Design U.S. Appl. No. 29/682,265 entitled "Air Conditioning Apparatus" filed Mar. 4, 2019.

(Continued)

*Primary Examiner* — Allen R. B. Schult
(74) *Attorney, Agent, or Firm* — Dinsmore & Shohl LLP

(57) ABSTRACT

The present embodiments relate to an air distribution apparatus for distributing conditioned airflow from a roof mounted air conditioner to the inside of a vehicle, which includes an inlet port adapted to receive the conditioned airflow from the roof mounted air conditioner. An outlet port, which is disposed adjacent to each longitudinal end of the apparatus, delivers conditioned airflow to the vehicle. An internal supply duct is adapted to evenly split the conditioned airflow to the outlet ports.

14 Claims, 7 Drawing Sheets

(56) References Cited

U.S. PATENT DOCUMENTS

| | | | |
|---|---|---|---|
| 3,680,468 A * | 8/1972 | Schueler | B60H 1/00364 |
| | | | 454/324 |
| D226,381 S | 2/1973 | Harty, Jr. | |
| 3,727,537 A | 4/1973 | Harty, Jr. | |
| 4,048,910 A | 9/1977 | Weir | |
| 4,182,227 A | 1/1980 | Roy | |
| D275,988 S | 10/1984 | Walker | |
| D284,025 S | 5/1986 | Armstrong | |
| 4,641,502 A | 2/1987 | Aldrich et al. | |
| 4,672,818 A | 6/1987 | Roth | |
| D306,341 S | 2/1990 | Bales et al. | |
| 5,046,405 A | 9/1991 | Roy | |
| 5,501,634 A | 3/1996 | Wilder | |
| 5,531,641 A | 7/1996 | Aldrich | |
| 6,213,197 B1 | 4/2001 | Ebbeson | |
| D510,996 S | 10/2005 | Madika | |
| 7,140,192 B2 | 11/2006 | Allen et al. | |
| D535,431 S | 1/2007 | Roland | |
| 7,171,822 B2 | 2/2007 | Allen et al. | |
| 7,234,315 B2 | 6/2007 | Allen et al. | |
| 7,237,397 B2 | 7/2007 | Allen | |
| D567,352 S | 4/2008 | Hollingsworth et al. | |
| D570,465 S | 6/2008 | Miyake et al. | |
| 7,419,368 B2 | 9/2008 | Milks | |
| D653,323 S | 1/2012 | Jacak et al. | |
| D654,998 S | 2/2012 | Zakula et al. | |
| D655,403 S | 3/2012 | Zakula et al. | |
| D661,386 S | 6/2012 | Bergin | |
| D681,794 S | 5/2013 | Lin et al. | |
| 8,535,127 B2 | 9/2013 | Malott | |
| 8,568,209 B2 | 10/2013 | Boxum | |
| D702,827 S | 4/2014 | Mase et al. | |
| D712,531 S | 9/2014 | Bergin | |
| D715,907 S | 10/2014 | Bergin | |
| D716,925 S | 11/2014 | Bergin | |
| D746,725 S | 1/2016 | Stopka | |
| D771,231 S | 11/2016 | Chen et al. | |
| D784,511 S | 4/2017 | Jonas et al. | |
| 9,631,832 B2 | 4/2017 | Malott | |
| D785,771 S | 5/2017 | Bergin | |
| D785,772 S | 5/2017 | Bergin | |
| D800,294 S | 10/2017 | Jonas et al. | |
| D800,295 S | 10/2017 | Jonas et al. | |
| D811,566 S | 2/2018 | Liu et al. | |
| D815,724 S | 4/2018 | Jonas et al. | |
| D817,466 S | 5/2018 | Moseley | |
| 9,975,405 B2 | 5/2018 | Siddiqui et al. | |
| D824,499 S | 7/2018 | Williamson et al. | |
| 10,093,152 B2 | 10/2018 | Allard et al. | |
| D834,163 S | 11/2018 | Liu et al. | |
| D841,138 S | 2/2019 | Williamson et al. | |
| 10,252,598 B2 | 4/2019 | Hipp-Kalthoff et al. | |
| D850,609 S | 6/2019 | Bergin | |
| D862,668 S | 10/2019 | Moseley | |
| D865,926 S | 11/2019 | Moseley | |
| 10,589,593 B2 | 3/2020 | Westendarp et al. | |
| 10,633,097 B2 * | 4/2020 | Al-Alusi | B05B 1/005 |
| D884,869 S | 5/2020 | Jonas et al. | |
| D899,582 S | 10/2020 | Appiahene-Agyei et al. | |
| D908,200 S | 1/2021 | Jonas et al. | |
| D917,036 S | 4/2021 | Hederstierna | |
| D948,698 S | 4/2022 | Huang et al. | |
| 11,376,925 B2 | 7/2022 | Williamson | |
| D967,388 S | 10/2022 | Chen | |
| D968,581 S | 11/2022 | Somei | |
| D987,057 S | 5/2023 | Choi et al. | |
| D987,807 S | 5/2023 | Zhou et al. | |
| 2006/0052050 A1 | 3/2006 | Malott et al. | |
| 2007/0227693 A1 | 10/2007 | Allen et al. | |
| 2009/0170421 A1 | 7/2009 | Adrian et al. | |
| 2010/0218531 A1 | 9/2010 | Khan | |
| 2016/0121695 A1 | 5/2016 | Sakurai | |
| 2016/0311288 A1 | 10/2016 | Mayo Mayo et al. | |
| 2017/0203632 A1 | 7/2017 | Westendarp et al. | |
| 2019/0047353 A1 | 2/2019 | Williamson et al. | |
| 2019/0047354 A1 | 2/2019 | Williamson et al. | |
| 2019/0315197 A1 | 10/2019 | Williamson et al. | |
| 2022/0032170 A1 | 10/2022 | Williamson et al. | |

FOREIGN PATENT DOCUMENTS

| | | |
|---|---|---|
| AU | 319630 S | 5/2008 |
| AU | 2004202967 B2 | 12/2010 |
| AU | 343538 | 7/2012 |
| AU | 2007237183 B2 | 9/2012 |
| AU | 349663 | 7/2013 |
| AU | 2007202766 B2 | 8/2013 |
| AU | 2012202939 B2 | 9/2013 |
| AU | 2008288394 B2 | 5/2014 |
| AU | 361242 | 4/2015 |
| AU | 2012261549 B2 | 5/2015 |
| AU | 2012265763 B2 | 7/2015 |
| AU | 201612249 | 5/2016 |
| AU | 2014203592 B2 | 5/2016 |
| AU | 201612412 | 6/2016 |
| AU | 2012224891 B2 | 6/2016 |
| AU | 201613590 | 7/2016 |
| AU | 201613591 | 7/2016 |
| AU | 201613592 | 7/2016 |
| AU | 201613593 | 7/2016 |
| AU | 2016101949 | 3/2017 |
| AU | 2016101949 B4 | 3/2017 |
| AU | 2017100215 | 3/2017 |
| AU | 2017100215 A4 | 3/2017 |
| AU | 201712363 | 5/2017 |
| AU | 2016200299 A1 | 7/2017 |
| AU | 2017200100 A1 | 7/2017 |
| AU | 2017200763 A1 | 9/2017 |
| AU | 2017203711 A1 | 1/2018 |
| AU | 201810968 | 3/2018 |
| AU | 201810969 | 3/2018 |
| AU | 201810970 | 3/2018 |
| AU | 201810971 | 3/2018 |
| AU | 201810972 | 3/2018 |
| AU | 201810973 | 3/2018 |
| AU | 201810975 | 3/2018 |
| AU | 201810977 | 3/2018 |
| AU | 201810978 | 3/2018 |
| AU | 2014203837 B2 | 4/2018 |
| AU | 201816419 | 1/2019 |
| AU | 2015226832 B2 | 5/2019 |
| AU | 2019202512 A1 | 10/2019 |
| AU | 201916408 | 12/2019 |
| AU | 201916409 | 12/2019 |
| CA | 2518348 | 3/2006 |
| CA | 2587994 | 12/2007 |
| CA | 2611822 | 5/2008 |
| CA | 2906348 | 9/2014 |
| CA | 2951956 | 12/2015 |
| CA | 165232 S | 5/2016 |
| CA | 165233 S | 5/2016 |
| CA | 167431 S | 2/2017 |
| CA | 172872 S | 2/2017 |
| CA | 172873 S | 2/2017 |
| CA | 172874 S | 2/2017 |
| CN | 1603626 A | 4/2005 |
| CN | 1816461 A | 8/2006 |
| CN | 101004173 A | 7/2007 |
| CN | 202867348 U | 4/2013 |
| CN | 204458347 U | 7/2015 |
| CN | 204704111 U | 10/2015 |
| CN | 204895032 U | 12/2015 |
| CN | 205533234 U | 8/2016 |
| CN | 205559279 U | 9/2016 |
| CN | 205559287 U | 9/2016 |
| CN | 106089711 A | 11/2016 |
| CN | 205853818 U | 1/2017 |
| CN | 106470856 | 3/2017 |
| CN | 106976376 A | 7/2017 |
| CN | 206446406 U | 8/2017 |
| CN | 109070688 A | 12/2018 |
| CN | 305029216 | 2/2019 |
| CN | 305029216 S | 2/2019 |
| CN | 305029217 S | 2/2019 |

(56) References Cited

FOREIGN PATENT DOCUMENTS

| | | |
|---|---|---|
| CN | 305029218 S | 2/2019 |
| CN | 305105066 S | 4/2019 |
| CN | 110385958 | 10/2019 |
| CN | 110385958 A | 10/2019 |
| CN | 305397384 S | 10/2019 |
| DE | 9116338 U1 | 10/1992 |
| DE | 10336767 | 12/2004 |
| DE | 202004017266 U1 | 4/2006 |
| DE | 102007019078 A1 | 9/2008 |
| DE | 102007038716 A1 | 2/2009 |
| DE | 602005012194 | 2/2009 |
| DE | 102011102343 A1 | 11/2012 |
| DE | 102010035406 B8 | 12/2012 |
| DE | 102016220768 | 4/2018 |
| DE | 112017000915 | 10/2018 |
| DE | 102018203428 B3 | 5/2019 |
| DE | 102019205194 | 10/2019 |
| DE | 102019205194 A1 | 10/2019 |
| EM | 005609252-0001 | 10/2018 |
| EM | 005609252-0002 | 10/2018 |
| EM | 005609252-0003 | 10/2018 |
| EP | 700801 | 3/1996 |
| EP | 1634740 | 3/2006 |
| EP | 1870270 | 12/2007 |
| EP | 1925889 | 5/2008 |
| EP | 1988612 | 11/2008 |
| EP | 2196390 | 6/2010 |
| EP | 2423013 A1 | 2/2012 |
| EP | 2423019 B1 | 8/2015 |
| EP | 3113965 | 1/2017 |
| EP | 3241695 | 4/2018 |
| EP | 3411250 A1 | 12/2018 |
| JP | 2005-146987 A | 6/2005 |
| JP | 2005-147071 A | 6/2005 |
| KR | 20050054812 A | 6/2005 |
| KR | 20110098484 A | 9/2011 |
| KR | 10-1718014 B1 | 3/2017 |
| WO | 2009021994 A1 | 2/2009 |
| WO | 2014143181 A1 | 9/2014 |
| WO | 2017143393 A1 | 8/2017 |
| WO | 2017143394 A1 | 8/2017 |
| WO | 2019038023 A1 | 2/2019 |
| WO | 2019082168 | 5/2019 |
| WO | 2019097448 A1 | 5/2019 |
| WO | 2019229706 A1 | 12/2019 |

OTHER PUBLICATIONS

Utility U.S. Appl. No. 16/722,938 entitled "Roof Top Air Conditioner Unit, Methods for Producing, Assembling and Installing the Roof Top Air Conditioner Unit and Vehicle with the Roof Top Air Conditioner Unit" filed Dec. 20, 2019.
Utility U.S. Appl. No. 16/384,376 entitled "Air Distribution Apparatus" filed Apr. 15, 2019.
Design U.S. Appl. No. 29/660,094 entitled "Air Distribution Box" filed Aug. 17, 2018.
Design U.S. Appl. No. 29/645,887 entitled "Mobile Air Conditioner" filed Apr. 30, 2018.
U.S. Appl. No. 62/819,711 entitled "Mobile Air Conditioner" filed Mar. 18, 2019.
Utility U.S. Appl. No. 16/744,584 entitled "Parking Cooler" filed Jan. 16, 2020.
Dometic Product Catalog, Climate Control, 2015.
Dometic Product Catalog, Climate Control, 2016.
Australian Patent Application No. 2017200186 entitled "Parking Cooler" filed Jan. 11, 2017.
Design U.S. Appl. No. 29/604,433 entitled "Air Conditioning Apparatus" filed May 17, 2017.
Design U.S. Appl. No. 29/620,394 entitled "Air Shroud Assembly" filed Oct. 4, 2017.
Design U.S. Appl. No. 29/677,547 entitled "Modular Air Gill" filed Jan. 22, 2019.
Design U.S. Appl. No. 29/594,476 entitled "Shroud Assembly" filed Feb. 17, 2017.
Australian Patent Application No. 201612249 entitled "Air-Conditioning Unit" filed Apr. 28, 2016.
Design U.S. Appl. No. 29/915,483 titled "Air Distribution Box" filed on Oct. 31, 2023.
Notice of Allowance Issued for U.S. Appl. No. 29/774,535 mailed on Mar. 23, 2023.
Non Final Office Action Issued in U.S. Appl. No. 16/384,376 mailed on Apr. 5, 2021.
Advisory Action Issued in U.S. Appl. No. 16/384,376 mailed on Jan. 25, 2022.
Corrected Notice of Allowance Issued for U.S. Appl. No. 16/384,376 mailed on Mar. 9, 2022.
Notice of Allowance Issued for U.S. Appl. No. 16/384,376 mailed on Mar. 30, 2022.
Final Office Action Issued in U.S. Appl. No. 16/384,376 mailed on Aug. 27, 2021.
Office Action for Germany Patent Application No. 102019205194.4 mailed on Apr. 27, 2022.
Office Action for Germany Patent Application No. 112019002266.0 mailed on May 16, 2023.
Office Action issued in Chinese Patent Application No. 201980036421 mailed on Mar. 31, 2023.
Corrected Notice of Allowability Issued for U.S. Appl. No. 29/774,535 mailed on Jun. 22, 2023.
Office Action issued in Chinese Patent Application No. 201910236428.9 mailed on Jun. 30, 2023.
Notice of Allowance Issued for U.S. Appl. No. 16/384,376 mailed on Feb. 22, 2022.
U.S. Appl. No. 17/854,869 titled "Air Distribution Apparatus" filed on Jun. 30, 2022.
Notice of Allowance Issued for U.S. Appl. No. 17/854,869 mailed on Mar. 29, 2023.
Corrected Notice of Allowability Issued for U.S. Appl. No. 17/854,869 mailed on May 19, 2023.
Corrected Notice of Allowability Issued for U.S. Appl. No. 17/854,869 mailed on Jun. 20, 2023.
Corrected Notice of Allowability Issued for U.S. Appl. No. 17/854,869 mailed on Jul. 10, 2023.
Notice of Allowability Issued for U.S. Appl. No. 29/774,535 mailed on Jul. 19, 2023.
Corrected Notice of Allowability Issued for U.S. Appl. No. 17/854,869 mailed on Aug. 9, 2023.
Corrected Notice of Allowability Issued for U.S. Appl. No. 29/774,535 mailed on Aug. 24, 2023.
Corrected Notice of Allowability Issued for U.S. Appl. No. 29/774,535 mailed on Sep. 11, 2023.
Office Action issued in CN Application No. 201910236428.9 mailed on Dec. 27, 2023.
Office Action issued in CN Application No. 201980036421.0 mailed on Dec. 21, 2023.
Notice of Allowance Issued for U.S. Appl. No. 29/660,094 mailed on Dec. 22, 2020.
"BIS4 ADB Air Distribution Box", Retrieved From https://www.dometic.com/en-sg/sg/products/climate/air-conditioners/motorhome-and-caravan-air-conditioners/dometic-ibis4-adb-_-188839, Dec. 2, 2020, 6 Pages.
Office Action Issued in German Application No. 112019002266 mailed on Jan. 25, 2022.
Office Action for Germany Patent Application No. 102017214941.8 mailed on Nov. 29, 2019 (English Summary attached).
Restriction Requirement Issued for U.S. Appl. No. 29/660,094 mailed on Sep. 23, 2020.
U.S. Appl. No. 29/660,094, of Rickard, H., et al., filed Aug. 17, 2018.
AU Provisional Patent Application No. 2018901268, of Williamson, J., et al., filed Apr. 16, 2018.
AU Provisional Patent Application No. 2018901939, of Williamson, J., et al., filed May 31, 2018.
PCT Patent Application No. PCT/IB2019/054509, of Williamson, J., et al., filed May 31, 2019.

(56) References Cited

OTHER PUBLICATIONS

Notification to Grant Patent for Chinese Design Application No. 201830456867.7, mailed Dec. 3, 2018.
Notification to Grant Patent for Chinese Design Application No. 201830456885.5 , mailed Nov. 30, 2018.
International Search Report and Written Opinion for PCT Patent Application No. PCT/IB2019/054509 on Aug. 26, 2019.
Notification to Grant Patent for Chinese Design Application No. 201830456864.3, mailed Dec. 3, 2018.
CN Patent Application No. 201980036421 entitled "Air conditioner for a vehicle" filed on Nov. 20, 2020.
DE Patent Application No. 112019002266 entitled "Air conditioner for a vehicle" filed on Nov. 30, 2020.
Design U.S. Appl. No. 29/774,535 entitled "Air Distribution Box" filed on Mar. 17, 2021.
Notice of Allowance in U.S. Appl. No. 29/660,094 dated Dec. 22, 2020.
Examination Report issued in AU application No. 2019202512 mailed on Mar. 12, 2024.
Notification to Grant Patent for Chinese Application No. 201910236428.9, mailed Apr. 4, 2024.
Office Action issued in Chinese Application No. 201980036421.0 mailed on Mar. 21, 2024.

\* cited by examiner

AIR DISTRIBUTION APPARATUS

CLAIM TO PRIORITY

This continuation patent application claims priority to and benefit of, under 35 U.S.C. § 120, U.S. patent application Ser. No. 17/854,869 filed Jun. 30, 2022, and titled "Air Distribution Apparatus", which claims priority to U.S. Pat. No. 11,376,925, filed Apr. 15, 2019, which claims priority to Australian patent application AU 2018901268, filed Apr. 16, 2018, also titled "Air Distribution Apparatus", all of which is incorporated by reference herein.

FIELD OF INVENTION

The present embodiments relate to an air distribution apparatus and, in particular, to an air distribution apparatus for a vehicle air conditioner.

An air distribution apparatus for a rooftop air conditioner for a recreational vehicle will be described hereinafter with reference to this application. However, it will be appreciated that the invention is not limited to this particular field of use.

BACKGROUND

The following discussion of the prior art is intended to place the invention in an appropriate technical context and enable the associated advantages to be fully understood. However, any discussion of the prior art throughout the specification should not be considered as an admission that such art is widely known or forms part of the common general knowledge in the field.

Air conditioning systems are commonly used in order to make an environment more pleasing to occupants. This is particularly relevant when the occupants are in a confined space, such as a caravan, mobile home or other recreational vehicle.

As used herein, the term 'recreational vehicle' refers to motor homes, recreational vans, and other similar vehicles. Each of these has relatively confined spaces for the occupants to reside in and, as due to the nature of their use it is often that such vehicles are often used with a number of people, such as couples or families.

Conventional recreational vehicles have air conditioning systems that are built into the vehicle in some manner. For example, the air conditioning unit can be installed into the floor or roof and direct air around the interior cabin of the vehicles so that conditioned air is then provided for the occupants.

One problem with roof mounted air conditioners is the operational noise they generate. This noise is the result of airflow being delivered to the inside of the vehicle through ceiling mounted air distribution apparatuses, or boxes, containing outlet ports. Additionally, noise can come from operational noise from the roof mounted air conditioner.

One solution to this problem is to reduce the speed of the fans delivering the airflow to the vehicle. In this way the velocity and airflow noise across the outlet ports will be reduced. Reducing the fan speed will also reduce the operational noise of the air conditioner. However, the main problem with this solution is that less airflow is delivered to the vehicle, which in turn, reduces the distance the air flow can reach. Therefore, by simply reducing the fan speed, the areas of the vehicle that are away from the outlet ports will not have the same air conditioning affect.

It is an object of the present invention to overcome or ameliorate at least one of the disadvantages of the prior art, or to provide a useful alternative.

SUMMARY

According to some embodiments, there is provided an air distribution apparatus for distributing conditioned airflow from a roof mounted air conditioner to the inside of vehicle, the apparatus including:
- an inlet port adapted to receive the conditioned airflow from the roof mounted air conditioner;
- at least one outlet port disposed adjacent each longitudinal end of the apparatus for delivering conditioned airflow to the vehicle; and
- an internal supply duct adapted to evenly split the conditioned airflow to each the outlet port.

In one embodiment, the internal supply duct includes a raised splitter formation and two legs, each leg leading to one longitudinal end.

In one embodiment, each leg includes an upper convex surface for substantially redirecting the conditioned airflow.

In one embodiment, each leg includes a lower concave surface for substantially redirecting the conditioned airflow.

In one embodiment, each leg includes a lower convex surface downstream of the lower concave surface such that the height of each leg is relatively narrower at the centre of each leg.

In one embodiment, the height of each leg is relatively higher at the lateral sides of each leg.

In one embodiment, each leg includes a pair of opposed side walls, the side walls substantially diverging as each leg approaches each longitudinal end.

In one embodiment, each side wall is substantially curved.

In one embodiment, the apparatus includes a pair of outlet ports disposed at each longitudinal end.

In one embodiment, the supply duct includes a divider formation extending along a portion of each leg for evenly separating the conditioned airflow between each outlet port.

In one embodiment, the divider formation extends between the lower convex surface and a top surface of each leg.

In one embodiment, the raised splitter formation is substantially aligned with the centre axis of the inlet port.

In one embodiment, the air distribution apparatus includes a flexible inlet supply duct for fluidly connecting the inlet port to the roof mounted vehicle air conditioner.

In one embodiment, each leg includes a cross sectional area which increases as each leg respectively approaches each longitudinal end such that the velocity of the conditioned airflow reduces thereby reducing the airflow noise generated at each longitudinal end.

In one embodiment, the flexible inlet supply duct includes large radiused corners for minimising the flow disturbance of the conditioned airflow into the inlet port.

In one embodiment, each outlet port includes at least one movable louver for directing the conditioned airflow leaving each outlet port.

In one embodiment, the air distribution apparatus includes a pair of laterally disposed return air entry ports adapted to return air from the vehicle to the roof mounted vehicle air conditioner.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Embodiments of the invention will now be described, by way of example only, with reference to the accompanying drawings in which:

FIG. 3b is a further cross-sectional view of the air distribution apparatus of FIG. 1b removed from the recreational vehicle of FIG. 1a;

FIG. 4 is an underside perspective view of air distribution apparatus of FIG. 1b, installed on the inside of the recreational vehicle of FIG. 1a;

DETAILED DESCRIPTION OF THE PREFERRED EMBODIMENTS

Figure 1A:
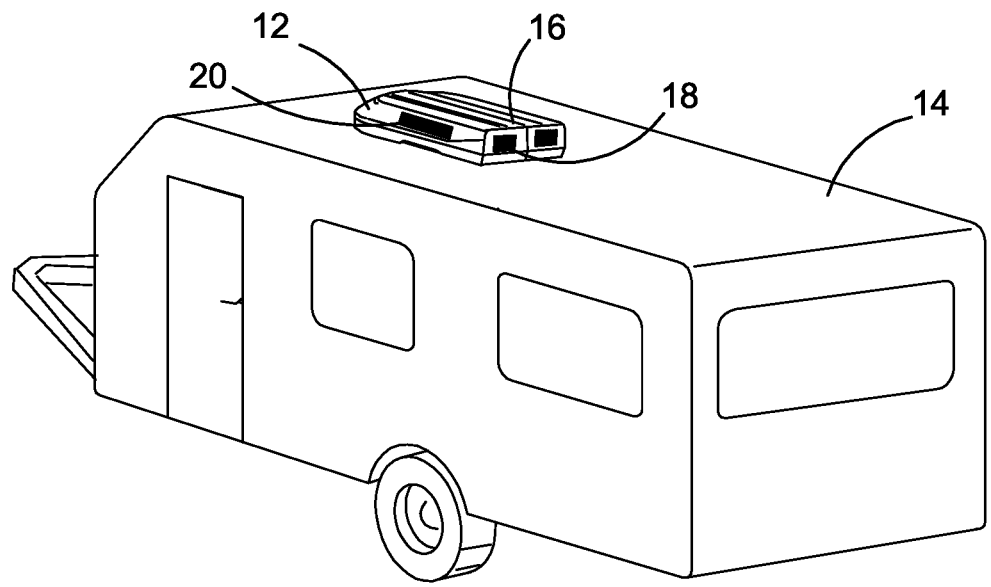
FIG. 1a is a perspective view of an air conditioner shown installed on a recreational vehicle.

Exemplary embodiments of the present invention will now be described in detail with reference to the accompanying drawings. In the drawings, the same elements are denoted by the same reference numerals throughout. In the following description, detailed descriptions of known functions and configurations incorporated herein have been omitted for conciseness and clarity.

Figure 1B:
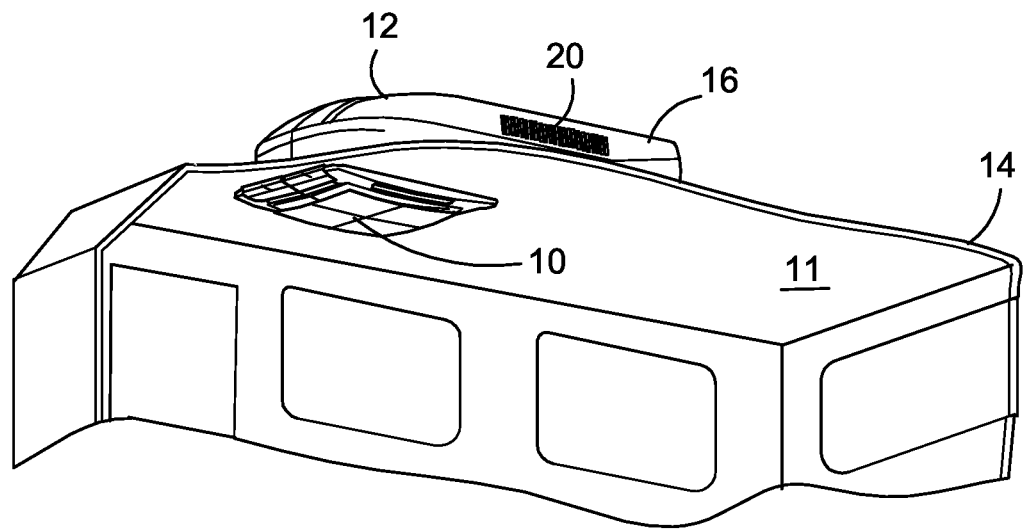
FIG. 1b is a partly cut away perspective view of an air distribution apparatus according to one embodiment of the present invention shown installed on the inside of a recreational vehicle of FIG. 1.

Referring to the accompanying drawings and initially to FIGS. 1a and 1b, there is provided an air distribution apparatus 10 for a vehicle roof mounted air conditioner 12. The air distribution apparatus 10 is mounted to the inside ceiling 11 of the vehicle 14. The apparatus 10 is fluidly connected to the air conditioner 12 which is mounted directly above on the vehicle's roof surface. Air distribution apparatus 10 is used to distribute the conditioned air from the air conditioner to the inside of the vehicle. In some applications, the air distribution apparatus is known generally as an air distribution box. Further, as used herein, the term vehicle is intended to encompass all such motorised and non-motorised vehicles. In the illustrated embodiment, the vehicle is a recreational vehicle such as a caravan or motor home.

Typical to the application, the roof mounted air conditioner 12 is of the type known as a packaged air conditioner, whereby the evaporator components are housed on the same base and within the same housing as the condenser components. This is contrary to a split type air conditioner, where the condenser components are housed remotely from the evaporator components. For this reason, the air conditioner 12 has an outer cover 16 having openings 20 and 18 to respectively allow for the ingress and egress of outside air to the condenser heat exchange area of the air conditioner.

Figure 2:
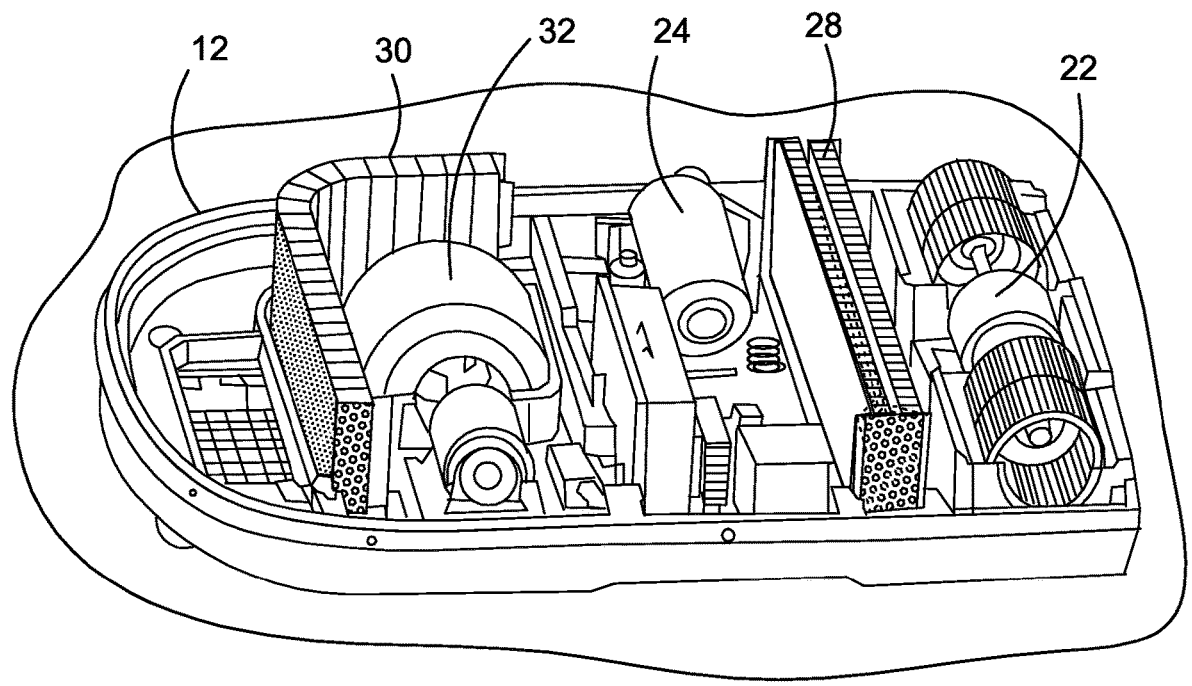
FIG. 2 is a perspective view of the air conditioner of FIG. 1a shown without its top cover.

More specifically, FIG. 2 shows a view of the air conditioner 12 with the outer cover 16 removed thereby revealing condenser fan 22 that draws outside air into a heat exchange area through openings 20. A compressor 24 is provided, which can be of any commercially acceptable type suitable for a portable air conditioner. Operatively connected to the compressor is a condenser coil 28.

As is commonly known in the art, air drawn in from the outside is forced across the condenser coil 28 to cool the contained refrigerant. The cooled refrigerant then passes through an expansion valve and into the evaporator coil 30 to absorb heat from the indoor air that passes over it. Therefore, air leaving the evaporator coil becomes conditioned. The conditioned air is then delivered to the air distribution apparatus 10 by way of an evaporator fan 32 which also draws in the return air from the inside of the vehicle over the evaporator coil 30. The refrigerant is then compressed and returns to the condenser coil 28 to once again be cooled. As should be apparent to those skilled in the art, this process can be reversed such that the conditioned air is heated rather than cooled.

Figure 3A:
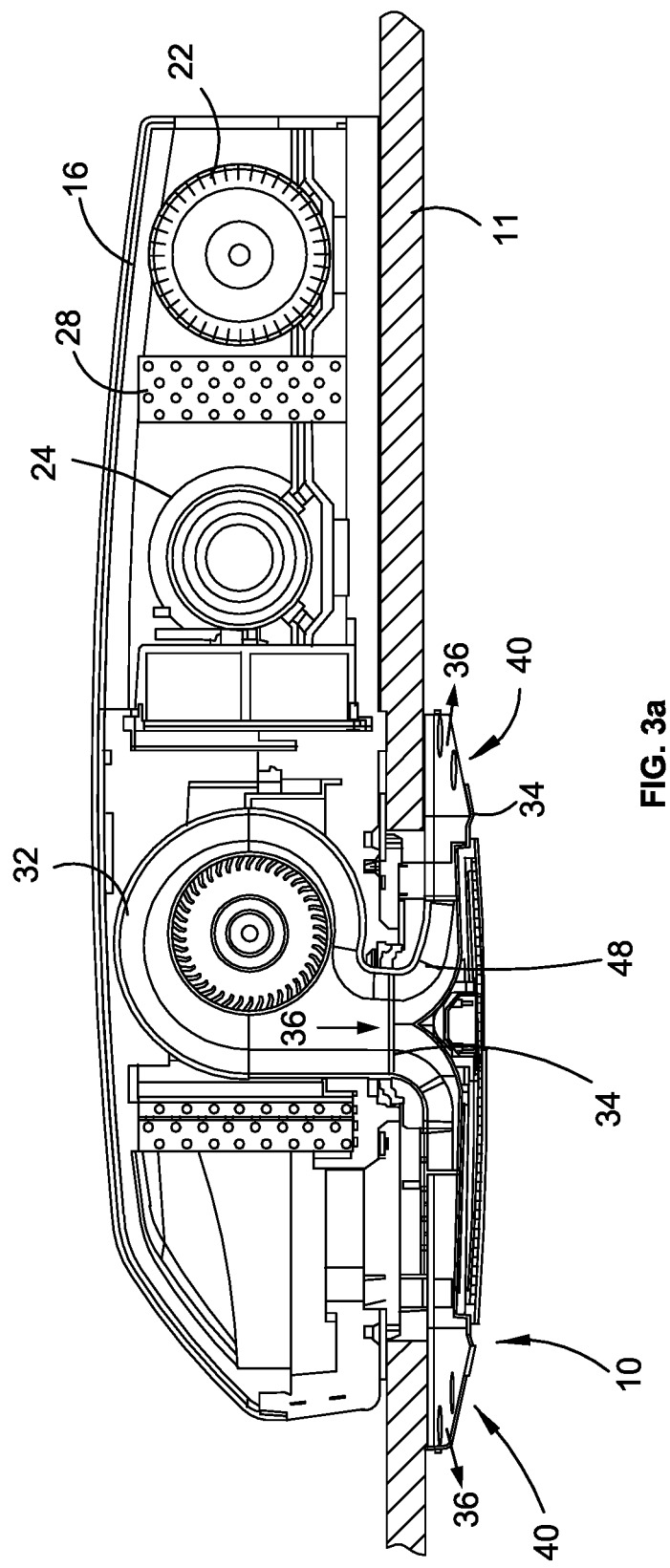
FIG. 3a side cross-sectional view of the air distribution apparatus of FIG. 1b.

Referring to FIG. 3a, we can see a side sectioned view of an example embodiment of the air distribution apparatus 10 as it would be installed in FIG. 1b. As shown, the air distribution apparatus includes a main body 33 housing an inlet port 34 adapted to receive conditioned airflow 36 from the roof mounted vehicle air conditioner 12. At least one outlet port 40 is disposed adjacent each longitudinal end 42 of the apparatus, for delivering conditioned airflow 36 to the vehicle 14.

Figure 4:
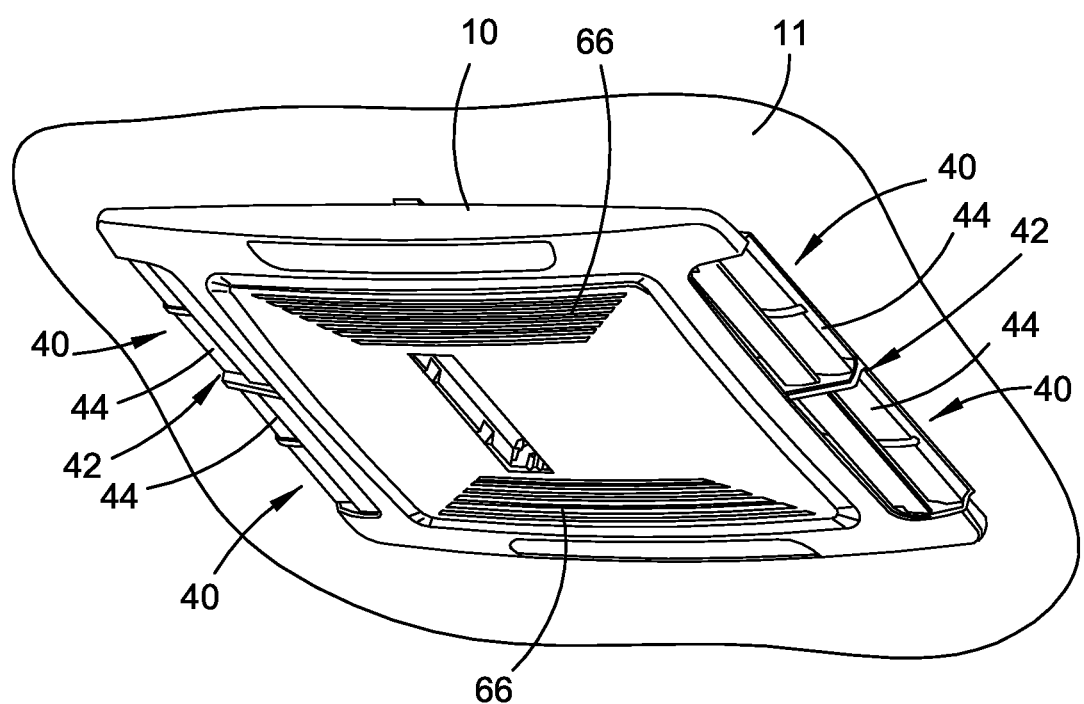

As best shown in FIG. 4, the apparatus 10 includes a pair of outlet ports 40 at each longitudinal end 42. Each outlet port 40 includes a pair of vertical spaced pivotally moveable louvers 44 for directing the conditioned airflow leaving each outlet port. In the illustrated embodiment, these louvres are movable during air conditioner operation to evenly distribute the conditioned airflow to different areas of the vehicle. Additionally, louvres 44 may be movable between a completely open to a completely closed configuration.

Figure 5:
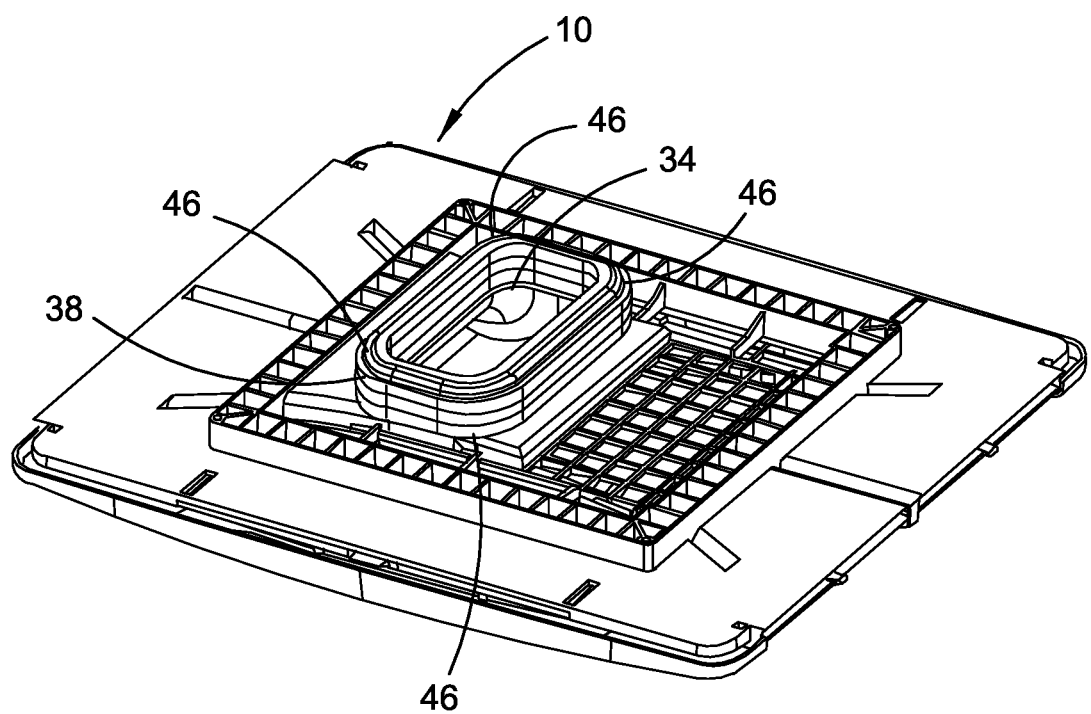
FIG. 5 is a topside perspective view of air distribution apparatus of FIG. 1b, removed from the recreational vehicle.

FIG. 5 depicts the apparatus 10 removed from the ceiling of the vehicle 14 to illustrate the features on the top surface. As can be seen, the inlet port 34 is connected to a flexible supply duct 38, which is then connected to evaporator fan 32 of the roof mounted air conditioner 12 when installed (see FIG. 3a). By having a flexible supply duct, minor positional misalignments between the inlet port and the evaporator fan 32 during installation can be advantageously compensated for, making the apparatus of the present invention easier and consequently less expensive to install. By having an extendible length, the flexible supply duct 38 also allows for different roof to ceiling distances making apparatus 10 applicable to different vehicle installations. The flexible supply duct 38 includes large radiused corners 46 for minimising the flow disturbance and pressure drop of the conditioned airflow into the inlet port 34. Similarly, the inlet port 34 and the evaporator fan 32 have corresponding radiused corners to sealingly connect with the flexible supply duct 38 and minimise pressure drop of the delivered airflow.

Figure 3B:
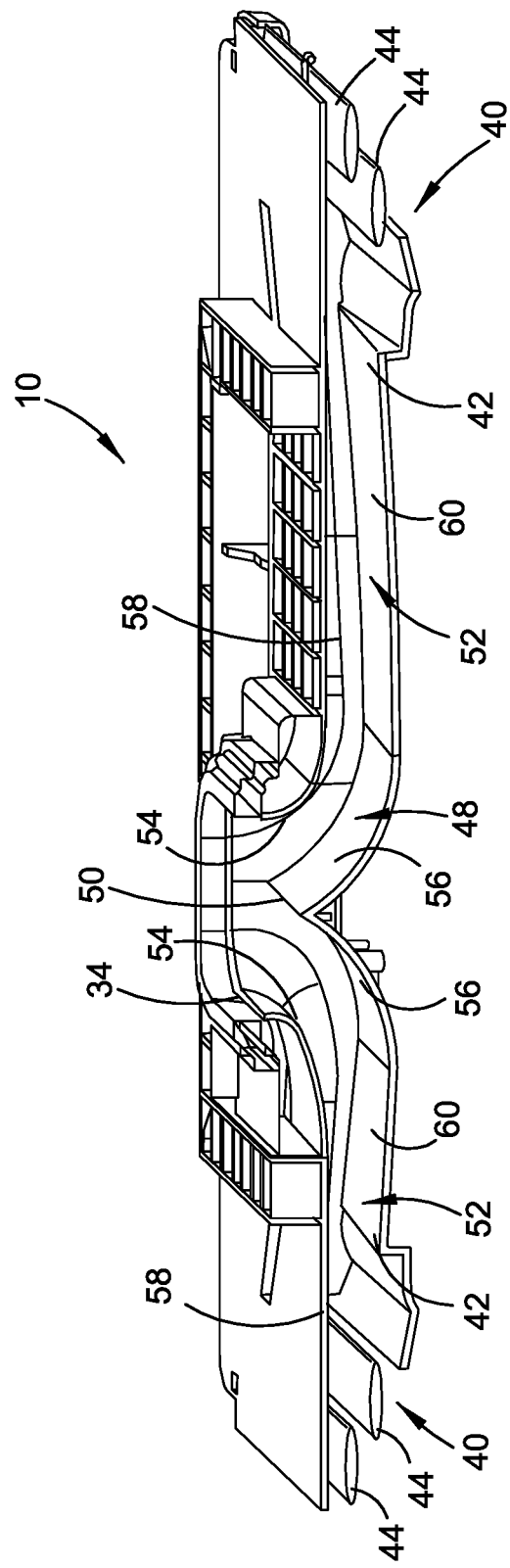

With reference to FIG. 3b, which shows the apparatus 10 removed from installation and partly sectioned, the apparatus 10 further includes an internal supply duct 48 for evenly distributing the conditioned airflow 34 from the inlet port 30 to each longitudinal end 42. The internal supply duct includes a raised splitter formation 50 substantially aligned with the lateral centre axis of the inlet port 34 when installed. The raised splitter formation 50 evenly splits the conditioned airflow 36 between a pair of legs 52, which extend to each longitudinal end 42 and the outlet ports 40.

Looking more closely at the inside of the internal supply duct 48, each leg 52 is defined by an upper convex surface 54 and a lower concave surface 56, relative to the inside of the internal supply duct. An upper straight surface 58 and a lower convex surface are respectively provided downstream of the upper convex and lower concave surfaces. By having both the upper convex surface 54, lower concave surface 56 and lower convex surface 60, a smooth redirection of the conditioned airflow 36 from the air conditioner is established resulting in minimal pressure drop of the conditioned airflow between the inlet port 34 and each outlet port 40.

Figure 6:
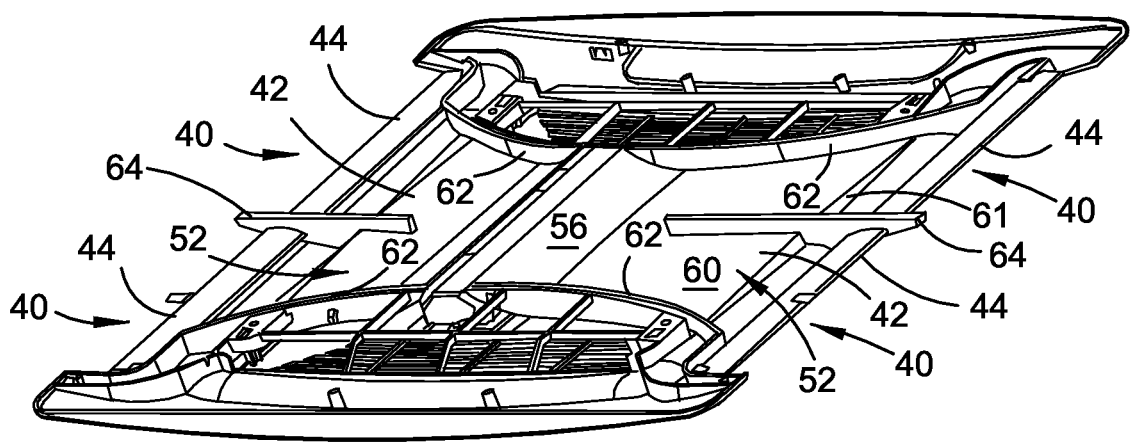
FIG. 6 top side cross-sectional view of the air distribution apparatus of FIG. 1b, removed from the recreational vehicle.

With reference to FIG. 6, we can see another sectioned view through the apparatus 10 removed from installation, however, from the perspective of the top looking down. Each leg 52 further includes a pair of opposed curved side walls 62, which generally diverge as each leg transitions to each longitudinal end 42. Again, the gradual divergence of the side walls minimises the pressure drop as the airflow travels across each leg 52.

As mentioned earlier, each leg includes a lower convex surface 60, which transitions from the lower concave surface 56. As can be seen, the lower convex surface extends between the opposed side walls 62 and rises at its centre where it is separated by a divider formation 64. As discussed in more detail below, a divider formation 64 has been provided at each longitudinal end 42 to assist in evenly separating the conditioned airflow between each outlet port 40. Whilst not clearly apparent from this view, each divider formation 64 extends between upper straight surface 58 and lower convex surface to completely separate the conditioned airflow between the outlet ports. Divider formation 64 also acts to support one end of each pivotally moveable louver 44.

Lower convex surface 60 has a convex profile from the perspective of each end of the apparatus. This is contrary to the upper convex surface, which has convex profile when looking at the side of the apparatus 10. Because of the lower convex surface 60, the height of each leg 52 is relatively narrower at its centre, and relatively higher at the sides of each leg. More specifically, lower convex surface 60 provides a reduced cross-sectional area in the centre portion of each leg 52, proximate the divider formation 64, and an increased cross-sectional area at the sides of each leg. As should be therefore appreciate it, the airflow will be promoted to the sides of each leg proximate the sidewalls 62, where a larger cross-sectional area provides less resistance. By separating the airflow in this way, a more even velocity distribution across the outlet ports is provided with minimal pressure drop loss. This, in turn, minimises the possibility of one outlet port 40 having a greater share of the airflow than any of the others. Lower convex surface 60 terminates with a step 61 leading to each outlet port 40.

Returning to FIG. 4, return air is supplied to the air conditioner through a pair of laterally disposed return air entry ports 66. This return air travels to the roof top air conditioner via pathways (not shown) on each side of the internal supply duct 48.

The apparatus of the present embodiments is formed primary from moulded plastics material as is commonly known in the art. However, other materials may be used without departing from the scope of the invention.

Referring again to FIGS. 3a and 3b, in use, conditioned airflow 36 from the roof air conditioner 12 flows into the flexible supply duct 38 where it enters the inlet port 32. From there the airflow 36 enters the internal supply duct 48. The airflow then contacts the raised splitter formation 50 to be evenly split between each leg 52. Conditioned air then travels to each longitudinally end 42 where it is again split by lower convex surface 60 and the divider formation 64 (FIG. 6) to be evenly delivered to each outlet port 40 and into the inside of the vehicle 12. Movable louvers 44 can oscillate during operation to deliver the conditioned airflow between proximate and distal regions of the inside of the vehicle.

It should be appreciated that due to the configuration of the internal supply duct 48, an even airflow split is provided between the two legs 52. In addition to this, the shape of the side walls 62, the lower convex surface 60 and the provision of the divider formation 64, result in equal flow to each outlet port 40 at each longitudinal end 42. In a practical sense, this means that each outlet port 40 equally accommodates the airflow distribution load, resulting in equal exit velocity leaving the outlet ports and consequently equal noise emissions from each outlet port. This is turn, results in lower overall air distribution noise level compared to prior art devices where non-even airflow distribution across the outlet ports create a higher noise from the outlet port accommodating the greatest airflow velocity.

Moreover, in a further aspect of the invention, the cross-sectional area of each of leg 52 increases as it transitions towards each longitudinal end and each lateral side of each leg, due to the diverging sidewalls 62 and lower convex surfaces 60 of the internal supply duct 48. In this way, the velocity of conditioned airflow 36 reduces as it approaches each longitudinal end 42 but is still evenly split between each outlet port 40. This reduction of velocity will, in turn, reduce the noise generated by the airflow exiting each outlet port 40.

Additionally, due to the smooth surfaces and gradual redirection provided by the configuration of internal supply duct 48 and large radius corners of the flexible supply duct and inlet port 34, the apparatus of the present invention provides a smooth non-restrictive path for the conditioned airflow with minimal interruptions for pressure loss. As a result, the speed of the fan providing the conditioned airflow can be slowed to supply a given airflow rate relative to prior art devices. In other words, using the air distribution apparatus of the present embodiments, increased airflow will be provided for a given supply fan rotational speed. Using the apparatus of the present embodiments compared to prior art devices results in a reduction of operational noise from the air conditioner and reduced energy use.

Advantageously, the apparatus of the present embodiments reduces the overall noise generated inside a recreational vehicle due the operation of a roof top air conditioner. Initially, this is due to providing an equal airflow distribution to each of the outlet ports, minimising the possibility of a high velocity noisy airflow from any one of the outlet ports. Secondly, by having an airflow path defined by the internal supply duct, a minimal pressure loss is provided between the exit of the evaporator fan 32 and each outlet port, resulting in low airflow distribution noise through the apparatus and relatively lower evaporator fan rotation speed. And thirdly, by the reducing the velocity of the airflow as it travels towards each outlet port, the noise of the airflow exiting each outlet ports is generally reduced.

It should be appreciated that in the above description of exemplary embodiments, various features are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

FEATURE LIST air distribution apparatus 10
roof mounted air conditioner 12
vehicle 14
outer cover 16
openings 18 and 20
condenser fan 22
compressor 24
condenser coil 28
evaporator coil 30
evaporator fan 32
main body 33
inlet port 34
conditioned airflow 36
flexible supply duct 38
outlet port 40
longitudinal end 42
moveable louvers 44
large radiused corners 46
internal supply duct 48
raised splitter formation 50
upper convex surface 54
lower concave surface 56
upper straight surface 58
lower convex surface 60
step 61
opposed curved side walls 62
divider formation 64
return air entry ports 66

The invention claimed is:

1. An air distribution apparatus, comprising:
an inlet port, configured to receive a downward flow of conditioned air from a roof mounted air conditioner;
at least two outlet ports configured to distribute the conditioned air within an interior of a vehicle;
a fixed splitter formation located between the inlet port and the at least two outlet ports, said fixed splitter formation dividing the conditioned air into a first air flow along a first leg to a first outlet port of said at least two outlet ports and a second air flow along a second leg to a second of said at least two outlet ports;
wherein said first air flow and said second air flow are redirected from said downward flow of conditioned air of said inlet port;
wherein said first leg and said second leg each comprise a upper convex surface and a lower concave surface which turn said first and second air flows;
said first and second legs each having side walls and said first and second legs being more narrow at said inlet port and wider at said at least two outlet ports;
a lower convex surface extending from said lower concave surface toward said at least two outlet ports of said first and second legs; and
one or more louvers located at ends of said first and second legs, wherein closure of one of the one or more louvers directs the conditioned air to an opposite side of the fixed formation splitter.

2. The air distribution apparatus of claim 1, said lower convex surface further comprising curvature between said side walls and a center of each of said first and second legs.

3. The air distribution apparatus of claim 1, said first leg and said second leg each having a varying cross-section moving toward respective said ends.

4. The air distribution apparatus of claim 1, a distance between said side walls changing along each said first and second leg.

5. The air distribution apparatus of claim 1, said legs reducing pressure drop through said redirection between said inlet port and said ends of said first and second legs.

6. The air distribution apparatus of claim 1 wherein said ends of said first and second legs define said at least two outlet ports.

7. An air distribution apparatus, comprising:
an inlet port configured to be positioned adjacent to a roof line of a vehicle having a roof mounted air conditioner disposed above the inlet port;
a first leg and a second leg defined by a fixed splitter formation disposed at said inlet port, said first leg extending in a first direction and said second leg extending in a second direction opposite said first direction;
each of said first leg and said second leg formed by an upper convex surface, a lower concave surface, a lower convex surface, and side walls;
each of said first leg and said second leg having a reduced cross-section at the lower convex surface and increased cross-section at the side walls to reduce pressure drop while changing direction of a conditioned air flow between said inlet port and a first end and a second end of respective said first leg and said second leg; and
a first louver located at said first end of said first leg and a second louver disposed at said second end of said second leg wherein closure of one of the first or second louvers directs the conditioned air to an opposite side of the fixed splitter formation toward the other of the first or second louvers.

8. The air distribution apparatus of claim 7, each of said first leg and said second leg having varying cross-section.

9. The air distribution apparatus of claim 8, each said leg changing width with along a direction of air flow.

10. The air distribution apparatus of claim 8, said side walls diverging along a length of each said first and second leg.

11. The air distribution apparatus of claim 7, said conditioned air flow moving air flow downwardly through said inlet port and turning toward said first end and said second end.

12. The air distribution apparatus of claim 7 wherein said first end and said second end each define an outlet port.

13. The air distribution apparatus of claim 7, said conditioned air being divided by said fixed splitter formation.

14. An air distribution apparatus, comprising:
- an inlet port, disposed near a roof line of a vehicle and configured to receive a downward flow of conditioned air from a roof mounted air conditioner;
- at least two outlet ports configured to distribute the conditioned air within an interior of said vehicle;
- a fixed splitter formation located between the inlet port and the at least two outlet ports, said fixed splitter formation dividing the conditioned air into a first air flow along a first leg to a first outlet port of said at least two outlet ports and a second air flow along a second leg to a second of said at least two outlet ports;
- wherein said first air flow and said second air flow of said conditioned air change direction from said downward flow of said inlet port to each of said at least two outlet ports;
- each of said first leg and said second leg formed by an upper convex surface, a lower concave surface, a lower convex surface, and side walls, and wherein each of said first leg and said second leg is more narrow toward said inlet port and wider toward each of said at least two outlet ports;
- said lower convex surface extending from said lower concave surface toward said at least two outlet ports of said first and second legs; and
- said first and second legs each comprising one or more louvers at said at least two outlet ports, wherein closure of one of the one or more louvers directs the conditioned air to an opposite side of the fixed splitter formation.

* * * * *